United States Patent [19]

Barnes

[11] Patent Number: 5,064,321

[45] Date of Patent: Nov. 12, 1991

[54] TOOLING PLATE

[76] Inventor: Gary D. Barnes, 1363 Woodelf Dr., San Jose, Calif. 95121

[21] Appl. No.: 547,974

[22] Filed: Jul. 3, 1990

[51] Int. Cl.⁵ .......................... B23C 9/00; B23Q 3/00
[52] U.S. Cl. .................................. 409/219; 269/303; 269/900
[58] Field of Search ............... 409/219, 220, 225, 218; 408/87, 91; 29/460; 269/900, 9, 10, 91, 99, 100, 54, 45, 95, 303, 315

[56] References Cited

U.S. PATENT DOCUMENTS

| | | | |
|---|---|---|---|
| 3,463,478 | 8/1969 | Hennessey | 269/900 |
| 3,967,816 | 7/1976 | Ramsperger et al. | 269/9 |
| 4,073,215 | 2/1978 | Coope et al. | 409/219 |
| 4,157,819 | 6/1979 | Meyer | 269/303 |
| 4,310,963 | 1/1982 | Blumle | 29/460 |
| 4,711,437 | 12/1987 | Longenecker et al. | 269/91 |

OTHER PUBLICATIONS

Wespo Catalog No. 12, "Clamps and Fixture Details", pp. 00-14, Vlier Engineering Corp., Nov. 1961.
"Modular Fixturing", Edward Hoffman, Manufacturing Technology Press, 1987.

Primary Examiner—William Briggs
Attorney, Agent, or Firm—John A. Frazzini

[57] ABSTRACT

A tooling plate having a plurality of columns of holes can be quickly and easily configured as a jig. Every second column contains threaded holes and the other columns contain unthreaded holes for reception of alignment pins. Alignment pins can be inserted into these unthreaded holes to produce a jig suitable for aligning a workpiece. The threaded holes are utilized by clamps that hold the workpiece rigidly in place and by an alignment bar that can be used to align the workpiece along any desired direction parallel to a front face of the tooling plate.

11 Claims, 8 Drawing Sheets

TOOLING PLATE

BACKGROUND OF THE INVENTION

This invention relates in general to machine tools and relates more particularly to attachments for a milling machine.

In the figures, each element indicated by a reference numeral will be indicated by the same reference numeral in every figure in which that element appears. The first two digits of any 4 digit reference numerals and the first digit of any two or three digit reference numerals indicates the first figure in which its associated element is presented.

Figure 1:
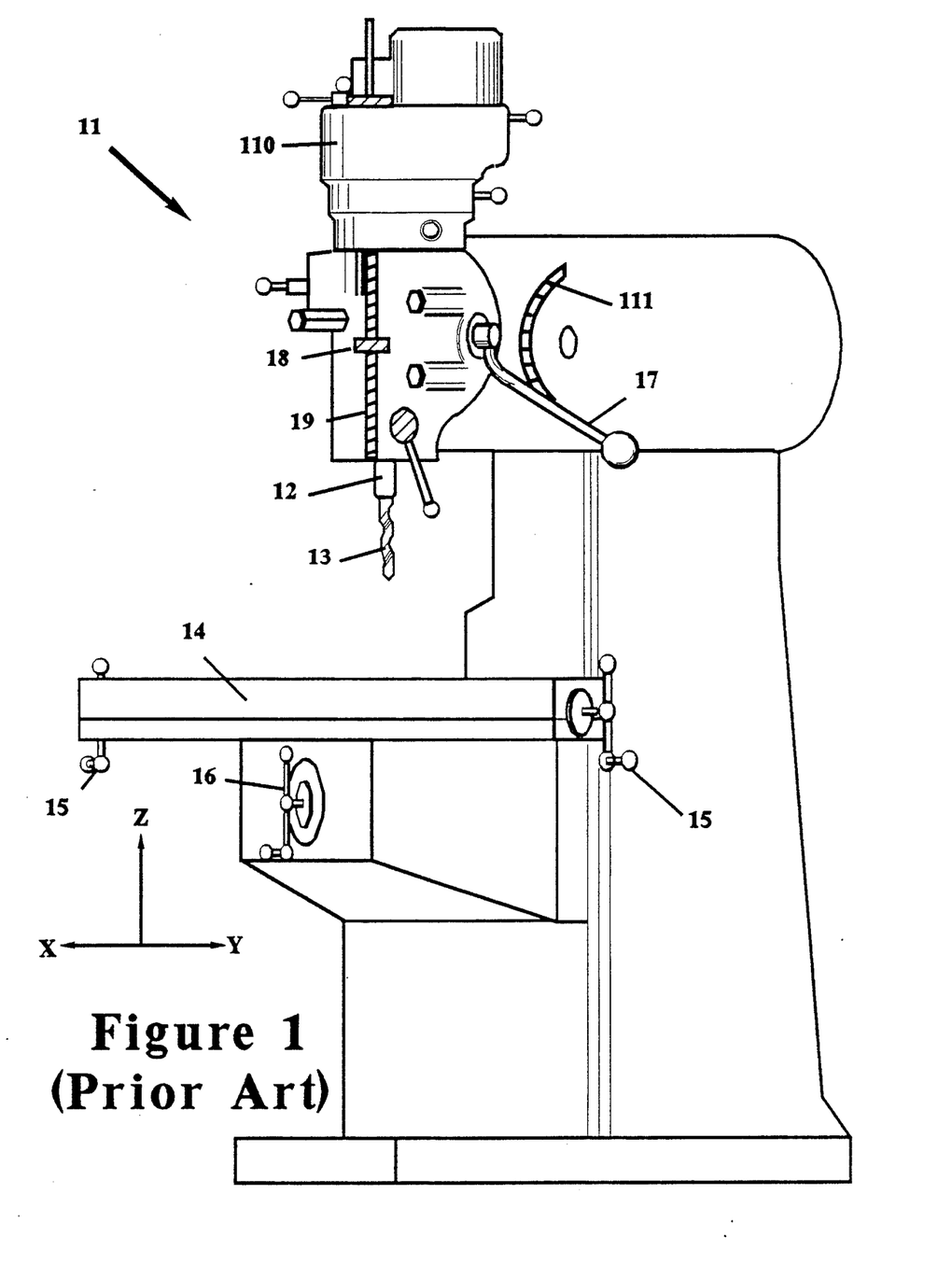
FIG. 1 illustrates a typical milling machine.

FIG. 1 illustrates a milling machine 11 that can be used to machine various workpieces. Such a machine can be utilized for many purposes including producing flat ends on workpieces, producing planar surfaces on workpieces, drilling holes, tapping holes and reaming holes. To perform such operations, this machine includes a chuck 12 into which can be inserted a variety of cutting tools 13 such as an endmill to produce flat ends, a flycutter to produce planar surfaces, a drill to drill holes, a tapping bit to thread holes and a reamer to size holes.

Milling machine 11 includes a milling table 14, having a top surface that is typically on the order of four feet long and fourteen inches wide, to which workpieces can be attached for application of various milling operations. Relative movement between the cutting tool and the workpiece is produced by rotating one or more of handles 15–17. Rotation of either of handles 15 produces movement of the table in the direction of the y-axis, rotation of handle 16 produces movement of the table in the direction of the x-axis and rotation of handle 17 produces movement of the cutting tool in the direction of the z-axis. A stop 18 can be positioned on a threaded shaft 19 to limit vertical (z-direction) movement of the chuck.

Figure 2:
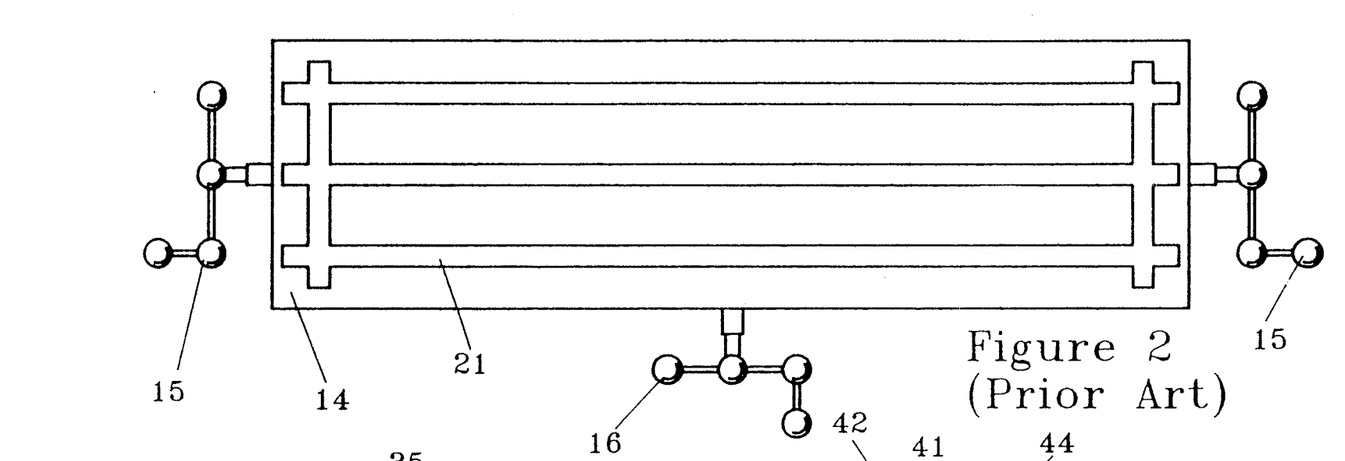
FIG. 2 is a top view of a milling table of the milling machine of FIG. 1.

A top view of the milling table is shown in FIG. 2. The top of this table contains a groove 21 to enable various items, such as vice 31 of FIG. 3, to be clamped to the milling table. Vice 31 includes a base 32 in which are formed a set of notches 33 that enable the vice to be clamped to the milling table. The top edges of groove 21 overhang recessed portions of the groove. This enables devices such as vice 31 to be clamped to the table by the bolt assembly of FIG. 4. This bolt assembly consists of a bolt 41, a washer 42 and a nut 43 having projections 44 that fit into the recessed portions of the groove. Four of these bolt assemblies are used to clamp vice 31 to the milling table. Vice 31 also includes a pair of vertical blocks 34 and 35 attached to base 32. Threaded into a hole in block 34 is a crank 36 that can be screwed inward to clamp a workpiece between crank 36 and block 35. A workpiece can also be bolted into holes 37 in block 35.

Figures 3, 4, 5:
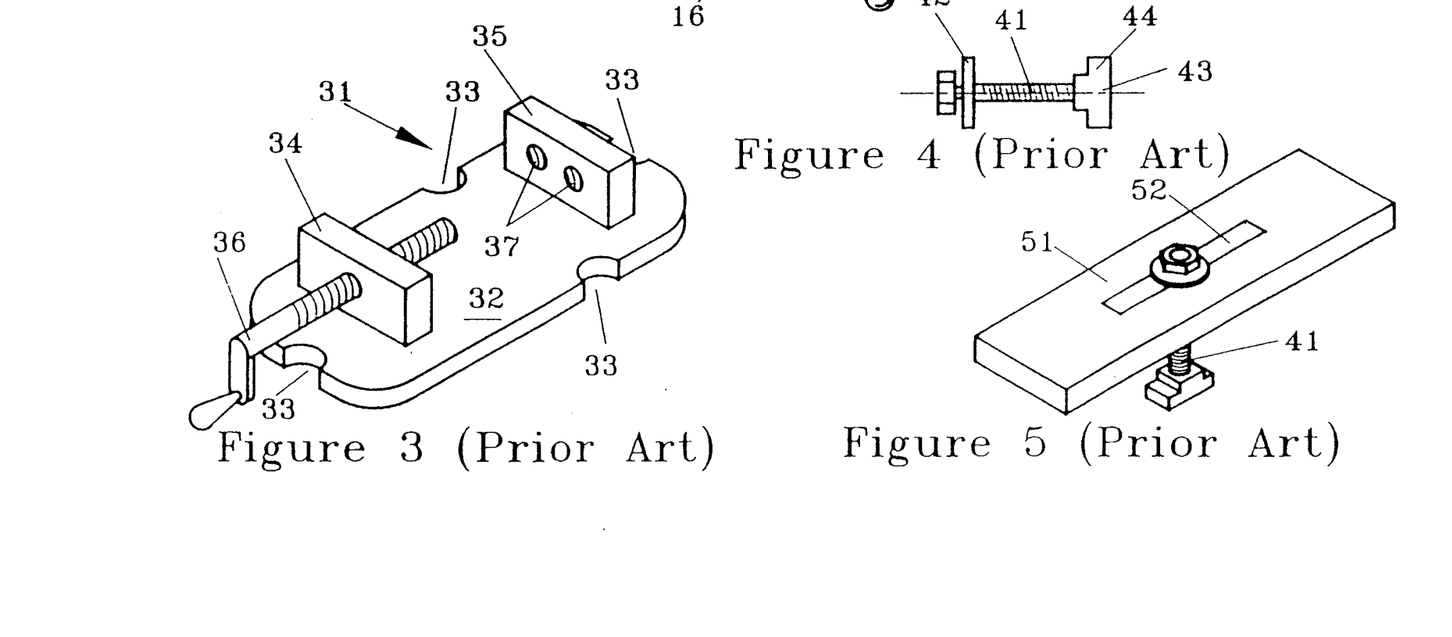
FIG. 3 illustrates a vice that can be clamped to the milling table.
FIG. 4 illustrates a bolt assembly that can be utilized to attach items to the milling table.
FIG. 5 illustrates a table clamp that enables items of extended size to be clamped to the milling table.

This bolt assembly can also be utilized with a table clamp 51 of FIG. 5 to produce a clamp that is suitable for clamping a variety of workpieces directly to the milling table. Table clamp 51 includes an elongated hole 52 to enable an adjustable amount of overlap of table clamp 51 on top of a workpiece.

Unfortunately, for milling operations in directions other than parallel to the x-, y- or z-directions, the head 110 of the milling machine needs to be rotated to properly tilt the axis of the cutting tool to enable such a nonstandard milling operation. To rotate head 110 by an angle $\theta$ about the y-axis, a set of four locking bolts are loosened, a crank is inserted over the head of a bolt used to tilt the head, the crank is turned to bring the head to the approximate rotational orientation desired and then the accuracy of this direction is checked.

A scale 111 gives a rough indication of the angular rotation. The accuracy of this scale is insufficient for the precision operations typically required of a milling machine. The desired precision in the angular rotation $\theta$ is achieved by use of a sine bar 61, Job blocks 62 and indicator 71 illustrated in FIGS. 6 and 7. The sine of $\theta$ is determined from a trigonometry table and the required height H of Job blocks needed to produce this angle is calculated as $L \cdot \sin \theta$, where L is the length of the sine bar. A selection of Job blocks that totals H is placed under one end of the sine bar, thereby accurately rotating the sine bar by an angle $\theta$ away the horizontal.

Figures 6, 7:
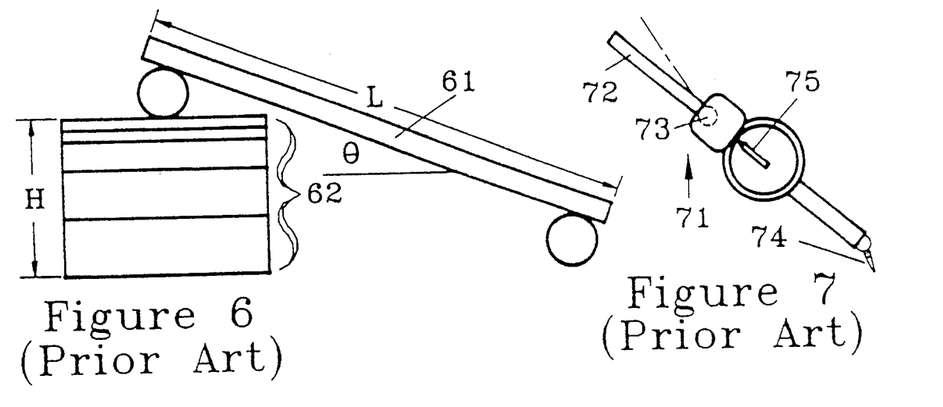
FIG. 6 illustrates the use of a sine bar and a set of Job blocks to produce a reference surface at a precisely defined angle $\theta$.
FIG. 7 illustrates a gauge suitable for testing whether the rotation axis of a sine bar is perpendicular to a top surface of a sine bar.

To check whether the rotation axis of chuck 12 is perpendicular to the surface of the sine bar, shaft 72 of gauge 71 is inserted into the chuck, this gauge is bent at ball pivot 73 to form an angle $\alpha$, stop 18 is adjusted to allow tip 74 of the gauge to come into light contact with the sine bar and then the chuck is rotated to swing tip 74 in a circular arc about the rotation axis of the chuck. Indicator 75 will deflect by an amount indicative of the degree of deflection of tip 74 by contact with the sine bar. The amount of deflection at the points of minimum and maximum deflection indicate how far the rotation axis of the chuck is from being perpendicular to the top surface of the sine bar.

The four locking bolts are again loosened, the head is tilted closer to the desired angle, these locking bolts are again tightened and gauge 71 is again utilized to test for perpendicularity. It typically takes several iterations of this process to set the head rotation accurately at the desired angle $\theta$. When the milling operations have been completed, this utilization of gauge 71 is repeated to orient the rotation axis of the chuck into a perpendicular relationship with the top surface of milling table 14.

The time involved in selecting the correct set of Job blocks can be avoided if the desired angle can be produced from some combination of "master angles". These master angles are wedges of metal that each has a pair of flat surfaces forming one of the master angles 0.25°, 3°, 4°, 5°, 6°, 10°, 15°, and 30°. Because of the increasing frequency of requests by customers for nonstandard milling angles, it is becoming less common that the master angles can be used to set the orientation of the head.

Even when these master angles can be utilized, the entire process of setting the angle of the head is very time consuming. This process of precisely setting the angle of the head takes on the order of one-half hour. After completion of the milling operation, another half hour is required to orient the rotation axis of spindle 12 perpendicular to table 14. In addition to the monetary value of the time required for each rotation of the head, an additional monetary investment of about $1,200 is required for the sine bar and the set of Job block. Both costs are significant to a small machine shop. The cost of the Job blocks can be avoided if the only angles required are ones that can be produced by some combination of master angles. However, customers are requiring nonstandard angles more and more often so that even this expense cannot be avoided.

Figures 8, 9:
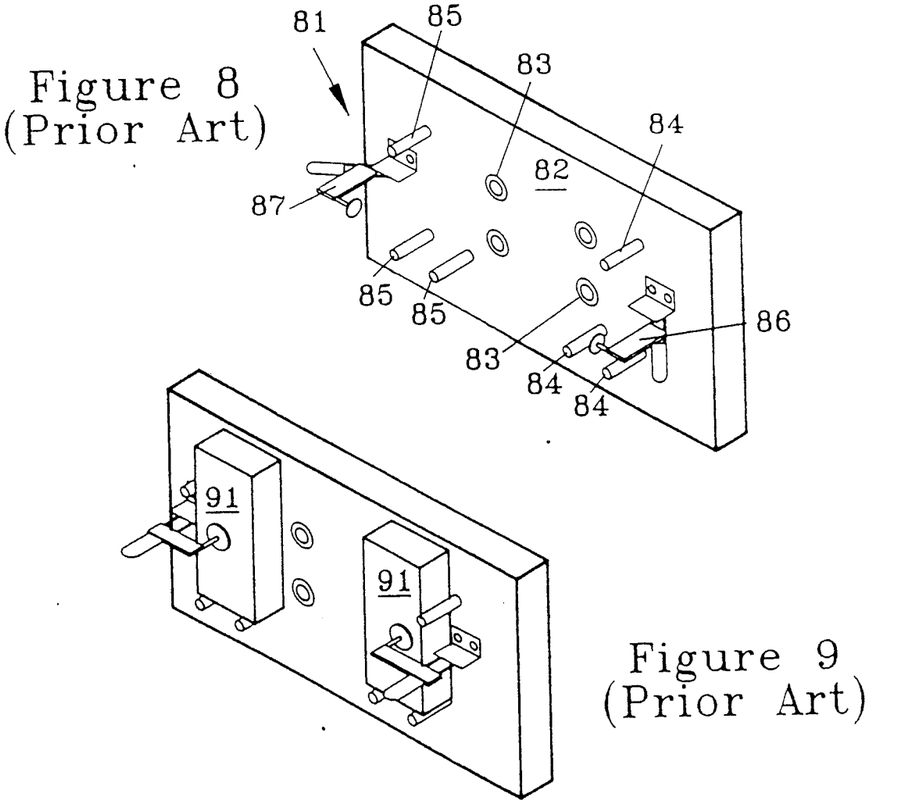
FIG. 8 illustrates a jig built to hold a pair of workpieces in preset positions and orientations.
FIG. 9 illustrates a pair of workpieces clamped to the jig of FIG. 8.

If the customer requires the production of several identical parts, then it can be cost effective to produce a jig that locates the workpiece at a particular position and that orients the workpiece at a particular angle. FIGS. 8 and 9 illustrate one such jig 81. This particular jig consists of a base plate 82 containing a set of holes 83 that enable it to be bolted to holes 37 in the vice of FIG. 3. Two sets of pins 84 and 85 are each positioned to position and orient an associated workpiece. Clamps 86 and 87 are utilized to hold the two workpieces 91 in place as illustrated in FIG. 9. The time and materials to produce such a jig can be justified only if the volume of parts to be machined using the jig is large enough that the cost savings in part production is more than the cost of producing the jig.

Circular parts also present a problem during milling operations. To prevent flattening the circular part and yet grab onto the part sufficiently firmly that the part will not turn during a milling operation, it is conventional to manufacture a set of "soft jaws". These jaws consist of a soft piece of metal into which have been formed a semicylindrical recess of diameter substantially equal to that of the round part that is to be milled. The cost of materials and time to manufacture such jaws can significantly increase the cost of milling operations on a single curved part or a small number of identical curved parts.

SUMMARY OF THE INVENTION

In accordance with the illustrated preferred embodiment, a tooling plate and associated hardware are presented that function as a versatile jig that can quickly and accurately position and orient workpieces. The cost of configuring the tooling plate into a specialized jig is significantly less than the time required to manufacture a specialty jig, such as is shown in FIGS. 8 and 9.

The preferred embodiment of this tooling plate consists of a rectangular array of holes arranged into a plurality of columns of threaded holes and a plurality of columns of unthreaded holes. By a column is meant a sequence of holes aligned in a straight line that is either parallel or perpendicular to an edge of the tooling plate that is utilized for alignment with a machine tool. By a "row" is meant a sequence of holes aligned in a straight line that is perpendicular to a column of holes. Each column of threaded holes is bracketed by a pair of columns of unthreaded holes. Preferably, the vertical spacing between holes is half the horizontal spacing between holes so that there exist pairs of holes in any pair of columns of unthreaded holes such that alignment pins can be set to produce angles of 30°, 45° and 60° relative to the direction of the columns.

All of these holes extend entirely through the tooling plate so that pieces of metal produced during milling operations can fall through these holes instead of collecting in the holes as could occur if these holes extended only part way through the tooling plate. On two opposite back edges of the tooling plate are a pair of rectangular recesses that facilitate clamping the tooling plate in a horizontal position into a vice without having the vice jaws overlap the top surface of the tooling plate, potentially interfering with the milling operation to be performed on a workpiece.

The hardware includes an alignment bar, a clamp, bolts suitable for attaching the tooling plate to a vice on the milling table, several unthreaded alignment pins, several bolts for threading into the threaded holes in the tooling plate and several washers for use with the bolts. Each unthreaded pin is sufficiently smaller in diameter than the unthreaded holes that the pin can be readily removed from the hole by hand and yet has a sufficiently close fit to the sides of the hole that the pins do not wobble within these holes or fall out if the tooling plate is turned upside down. In the wall of each of the unthreaded holes is a shoulder that acts as a stop for any unthreaded peg inserted into that hole. Preferably, standard 0.2502 inch dowel pins are utilized as the alignment pins so that the cost of such pins is low and so that they can be easily and inexpensively replaced.

At least two bolt holes are included in the tooling plate to enable it to be bolted to some item, such as the vice of FIG. 3, to rigidly attach this tooling plate to the milling table. Two opposite sides of this tooling plate have recessed corners to facilitate clamping this tooling plate horizontally into a vice. The tooling plate has a tough surface coating that resists scratching and wear.

The alignment bar includes an unthreaded hole of substantially the same diameter as the unthreaded holes of the tooling plate. The clamps each include at one end a threaded hole into which a bolt is screwed to space that end from the tool plate a distance equal to the thickness of the workpiece so that the clamp presses against the workpiece over substantially the entire area of the clamp that overlaps the workpiece. The clamp(s) also include an elongated slot of width slightly larger than the diameter of the threaded holes. An end of the clamp opposite the end with the unthreaded hole has a rounded edge to reduce the risk of damaging workpieces. The alignment bar also includes an elongated slot of width larger than the diameter of the threaded holes and smaller than the diameter of the washers. The alignment bar can be attached to the tooling plate at any desired angle so that the alignment bar can be used to align a workpiece at any desired angle relative to the rotation axis of spindle 12. The width and length of the clamps and alignment bar are preferably less than both the width and length of the tooling plate so that these pieces of hardware can be positioned on the tooling plate such that they do not extend beyond the edges of the tooling plate. This avoids interference between these pieces of hardware and operation of the milling machine.

These advantages of the present invention will become clear from the detailed description given below in which a preferred embodiment is described in relation to the drawings. The detailed description is presented to illustrate the present invention, but is not intended to limit it.

DESCRIPTION OF THE PREFERRED EMBODIMENT

Figures 10A, 10B:
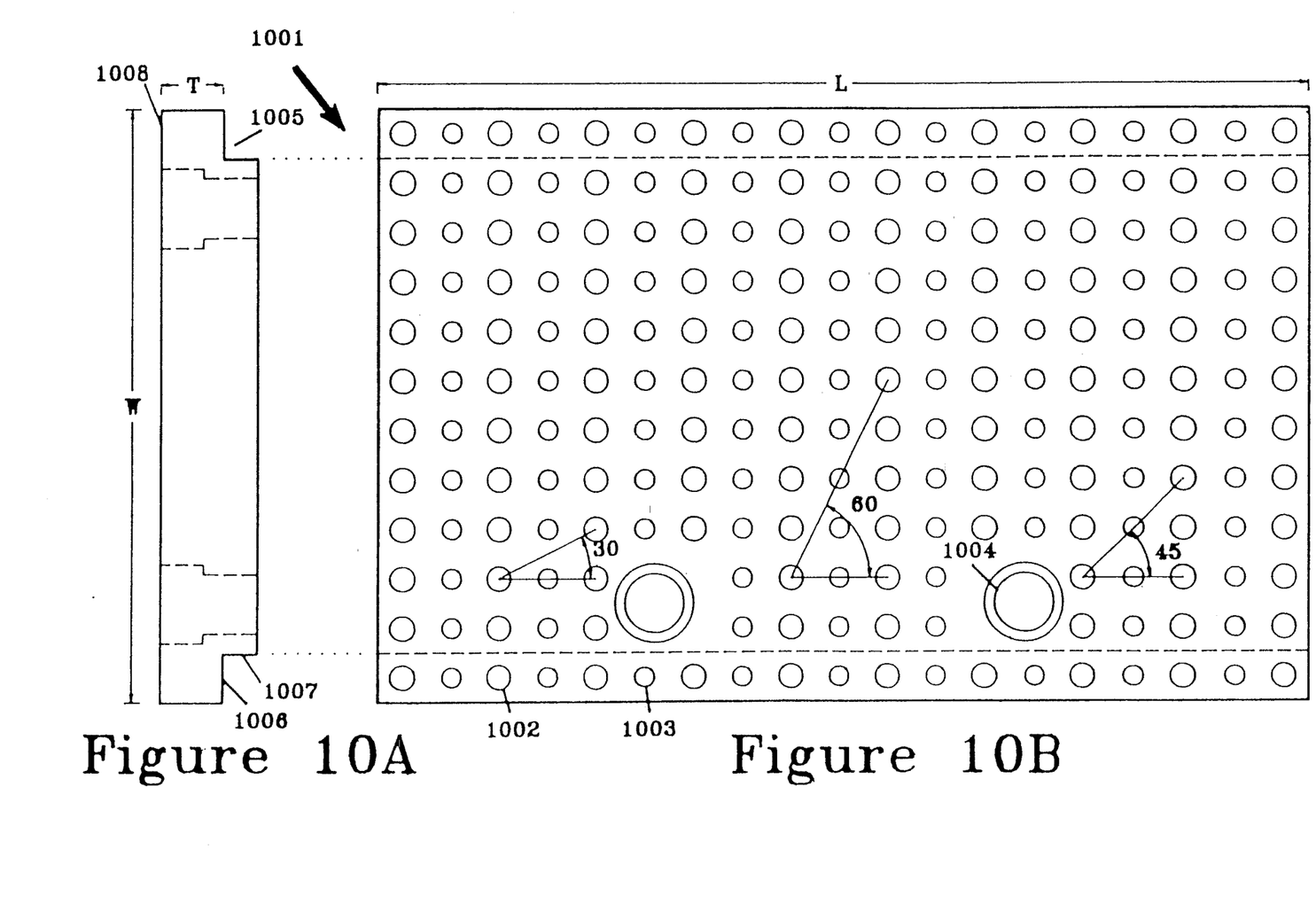
FIGS. 10A and 10B illustrate side and top views of a tooling plate, that, in conjunction with associated hardware, can be quickly configured as a jig to hold a workpiece for machining operations.
Figure 11:
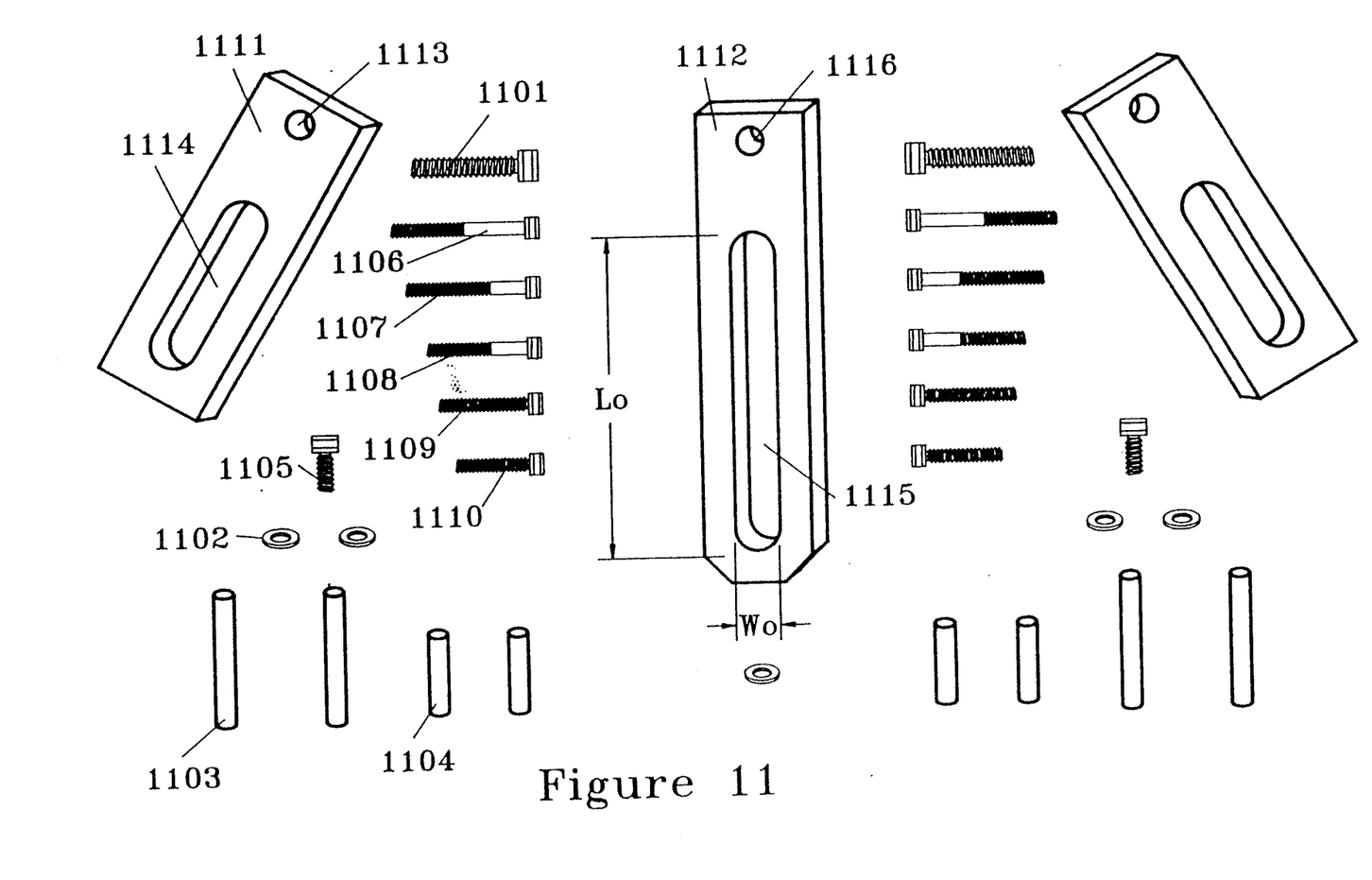
FIG. 11 illustrates associated hardware for use with the tooling plate to attach the plate to a milling table and to align and rigidly attach workpieces to the tooling plate so that they can be milled.

FIGS. 10A and 10B illustrate side and top views of a tooling plate 1001, that, in conjunction with associated hardware illustrated in FIG. 11, provides the capability of quickly producing a jig to orient and rigidly clamp a workpiece in an orientation required for machining the workpiece. This particular embodiment consists of a block of aluminum having a width W of 5.90 inches, a length L of 9.48 inches and a thickness T of 0.99 inches. A rectangular grid of holes, consisting of ten columns of unthreaded holes 1002 and nine columns of threaded holes 1003, are formed through this block in a direction perpendicular to the top surface. All but four of these columns contain twelve holes and the other four contain ten holes. In the columns containing only 10 holes are formed two holes 1004 that can be utilized to attach this tooling plate to milling table 14.

Each of these holes 1002-1004 extends entirely through this aluminum block so that particles that fall into one of these holes can fall through that hole. If these holes extended only part way through the block, then such particles would accumulate at the base of each such hole, eventually blocking insertion of associated hardware into these holes. This is particularly important in the machine shop environment in which these tooling plates will typically be used because of the large number of metal particles and shavings that are produced in such an environment.

A pair of rectangular recesses 1005 are formed into the back side of opposite ends of the alignment plate for use in clamping the tooling plate into a vice. Surfaces 1006 are parallel to the top surface 1008 of the tooling plate. Thus, when surfaces 1006 are placed into contact with the top surfaces of the jaws of vice 31, the top surface of tooling plate 1001 is aligned parallel to the top surface of milling table 14. The tooling plate is then held firmly in the vice by compressing the jaws of the vice against surfaces 1007. The width 5.980 inches of the block is wider than some vice jaws can be opened. Therefore, the recesses produce a reduced width region on the back of the tooling plate that can fit into the vice jaws even if the full width of the tooling plate exceeds the span of the vice jaws. After all holes and recesses have been formed in the tooling plate, the aluminum block is anodized with a hard black coating. This coating produces an extremely hard surface that substantially eliminates significant wear of the threaded and unthreaded holes.

Standard ¼ inch Allen head (i.e., cap screw) bolts having 13 threads per inch can be inserted through holes 1004 of the tooling plate and threaded into holes 37 of vice 31 (shown in FIG. 3) to attach tooling plate 1001 in a vertical alignment onto milling table 14 (of FIG. 1). This size bolt hole is standard on milling machine vices.

Unthreaded holes 1002 are adapted to receive an associated alignment pin such as pin 1103 or 1104. Threaded holes 1003 are adapted to receive an associated bolt such as any of bolts 1106-1110. Holes 1002 are 0.242 inch in diameter and include a 0.25025±0.00025 inch counterbore that extends 0.500 inch deep from the top surface. This produces in each of holes 1002 a lip that functions as a stop for an associated alignment pin 1103 or 1104. These alignment pins are slightly smaller (about 0.0008 inch) than holes 1002 so that each of these pins can be easily inserted into and/or removed from one of these holes and so that these pins do not wobble within these holes or fall out if the tooling plate is turned upside down.

Figure 12:
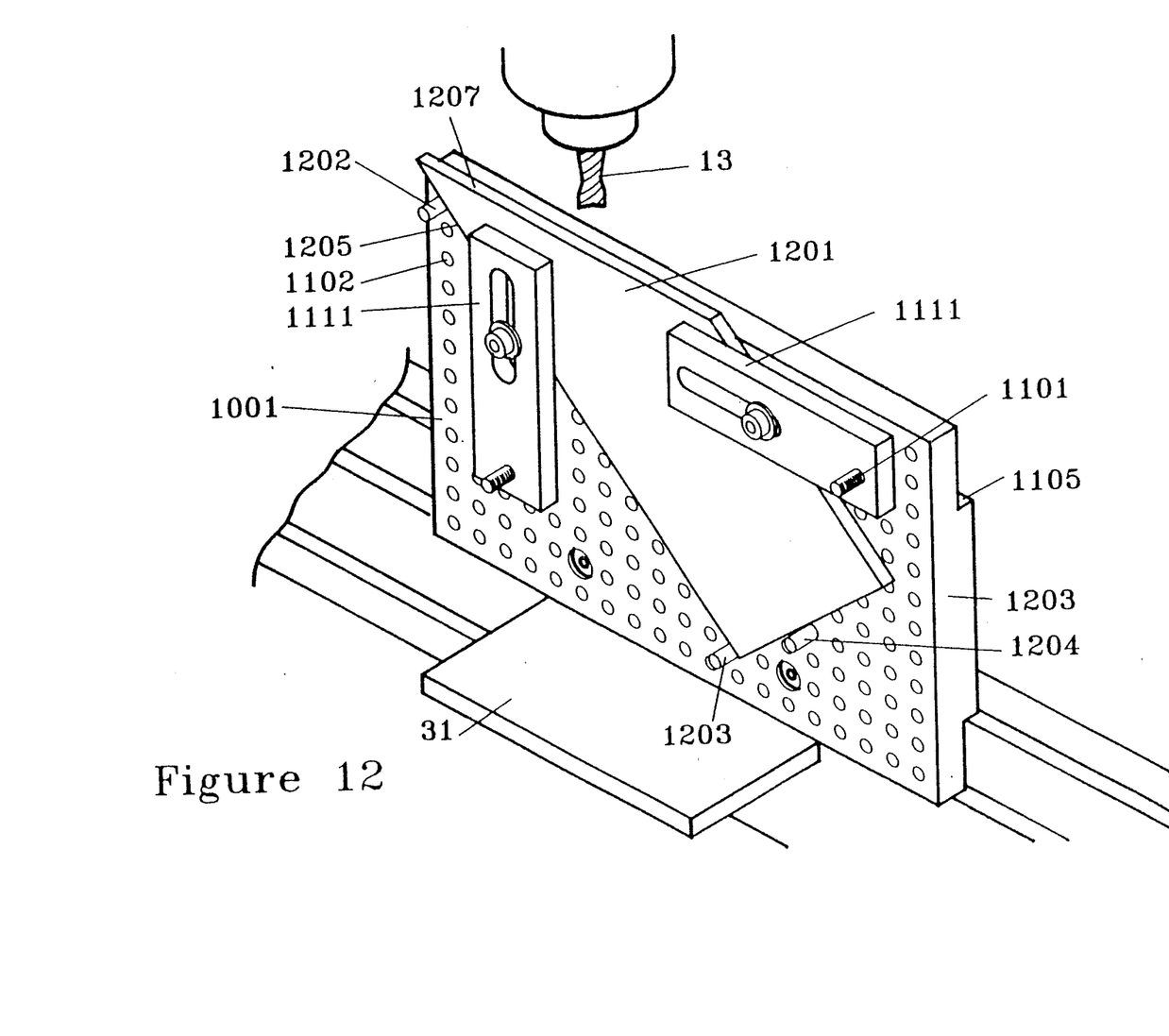
FIG. 12 illustrates the tooling plate bolted vertically into a vice to hold a workpiece to enable a flattened section to be milled on an end of the workpiece.
Figure 13:
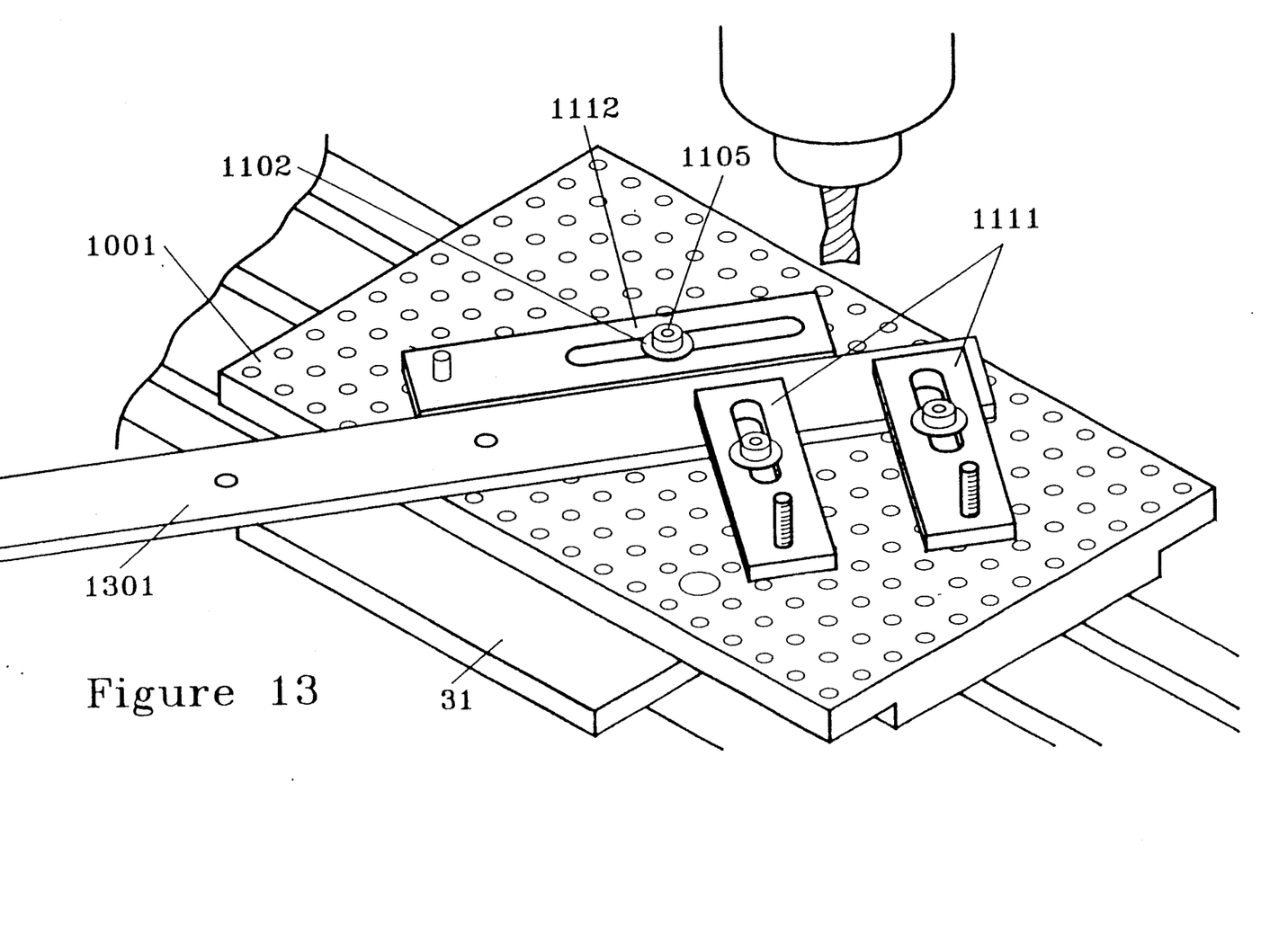
FIG. 13 illustrates the attachment of an extended item to the tooling plate in a precise orientation relative to the tooling plate.
Figure 14:
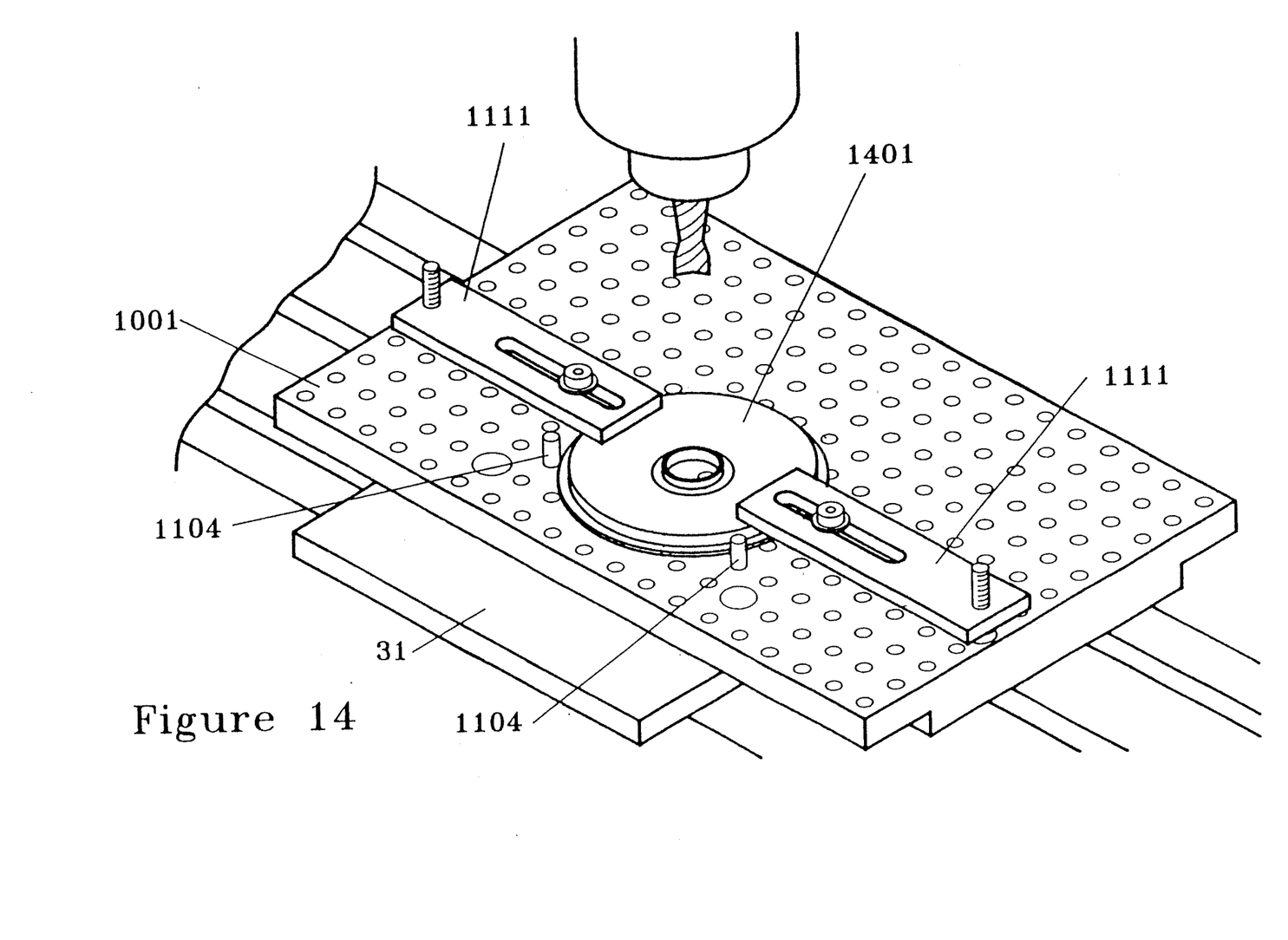
FIG. 14 illustrates the use of the tooling plate, clamped horizontally into a vice, to hold a curved piece for milling.

FIGS. 12-14 illustrate three particular jigs formed by the tooling plate and its associated hardware. FIG. 12 illustrates tooling plate 1001 bolted vertically into a vice 31 to orient a workpiece 1201 during a step of milling a flattened edge 1207 onto the workpiece. A set of three alignment pins 1202-1204 are inserted into the tooling plate at locations that quickly and accurately align the workpiece at the desired angle and at a repeatable position. Clamps 1111 are utilized to hold the workpiece firmly in this aligned position during machining of the workpiece.

In one end of each of clamps 1111 is a bolt 1101 oriented with the head of this bolt between clamp 1111 and tooling plate 1001. This bolt is screwed into a hole 1113 of clamp 1111 a distance such that the bottom surface of that end of the clamp is spaced from the tooling plate a distance substantially equal to the thickness of workpiece 1201. A bolt 1105, inserted through a washer 1102 and a slot 1114 of clamp 1111, is screwed into one of threaded holes 1002 in tooling plate 1001 to hold the workpiece rigidly against the tooling plate during machining of the workpiece.

In this particular case, pins 1202 and 1203 orient an edge 1205 of workpiece 1201 at a 45° angle from the vertical direction. Because the columns and rows are equally spaced, angles of 30, 45 and 60 are quickly and accurately set by selecting the ratio of column spacing for these two pins to row spacing equal to 2:1, 1:1 and 1:2, respectively. Clearly any angle equal to arcsine 2 m/n, where 2 m is the number of columns spacing between the alignment pins and n is the number of rows spacing between the alignment pins, can be set by this jig. For this embodiment, $-9 \leq m \leq 9$ and $-11 \leq n \leq 11$. However, the angles 30°, 45° and 60° are much more common than the other angles that can be produced by these spacings of the alignment pins. Pin 1204 aligns workpiece 1201 at a repeatable position in the direction parallel to side 1205 so that the workpiece can be quickly positioned relative to the tooling plate.

When a workpiece is to be oriented at an angle that is not equal to one of the angles listed above or if the workpiece is too small to fit against a pair of alignment pins spaced to produce the desired angle, then the angular orientation cannot be set by a pair of alignment pins as was done in FIG. 12. FIG. 13 illustrates the alignment of the workpiece by means of an alignment bar 1112. In this Figure, tooling plate 1001 is held in a horizontal orientation in the jaws of a vice 31 with the jaw of the vice pressing against surfaces 1007 of the tooling plate. As illustrated in FIG. 11, alignment 1112 includes a hole 1116 of diameter 0.251±0.0005 inch and a slot 1115 of width 0.375 inch and length 3.250 inch. To align bar 1112 at a desired angle, an alignment pin is inserted through hole 1116 into one of the unthreaded holes 1002 in the tooling plate and then bar 1112 is rotated about this pin until it is oriented at the desired angle. Typically, the desired angle is measured by means of a protractor. The width and length of slot 1115 are sufficiently large that, when this slot overlaps entirely on the grid of threaded holes, for any selected angular orientation of the alignment bar, at least one threaded hole lies entirely under slot 1115. A bolt 1105 and washer 1102 are then used to tighten the alignment bar against the top surface of the tooling plate.

Once the alignment bar has been aligned and clamped against the tooling plate, workpieces, such as workpiece 1301, can be oriented by aligning a flat surface of the workpiece against a side of this alignment bar. A pair of clamps 1111 are used to hold the workpiece firmly against the alignment bar and the top surface of the tooling plate so that the workpiece will be rigid during machining.

FIG. 14 illustrates the use of the tooling plate, clamped horizontally into a vice 31, to hold a circular workpiece. To position the circular workpiece 1401, a pair of alignment pins 1104 are inserted into a pair of unthreaded holes in tooling plate 1001. The spacing between these holes is slightly less than the diameter of the circular workpiece. Once the workpiece has been aligned against these pins, a pair of clamps 1111 are utilized to hold the workpiece rigidly against the tooling plate.

The tooling plate can be manufactured on a computerized milling machine by the following steps. Fly cut the top and bottom surfaces of a block of aluminum to make these two surfaces parallel. Use an end mill to cut the two recesses along the top and bottom back edges of this block of aluminum. Grab this block at these recesses with the jaw of a vice attached to a tape machine so that the top and bottom surfaces of this block are parallel to the top surface of the milling table of the computerized milling machine. An end mill is now used to square off the sides of the aluminum block. All unthreaded holes 1002 are center drilled with a 5/16 inch drill bit and then drilled with a 0.242 inch diameter bit. These holes are then reamed with a 0.252 inch diameter bit to a depth of 0.550 inches, thereby producing the shoulder that serves as a stop for the alignment pins. After anodizing the tooling plate, these holes have a 0.251 inch diameter. Therefore, the alignment pins, which have a 0.2502 inch diameter, fit these holes such that there is substantially no wobble of these pins and yet the pins can be easily and quickly inserted or removed from these unthreaded holes.

Holes 1003 are drilled with a 0.201 inch diameter bit and then these holes are tapped completely through the tooling plate to form threads spaced at 20 threads per inch. The aluminum block is next deburred either by hand or in a tumbler and then anodized to produce the black anodized coating that protects the tooling plate from wear and damage. The clamps are made of steel, plated with a gold-zinc protective coating that protects them from rusting.

The foregoing detailed description is illustrative of the invention and it is to be understood that additional embodiments thereof will be obvious to those skilled in the art. This description, together with those additional embodiments obvious to those skilled in the art, are considered to be within the scope of the invention.

I claim:

1. An apparatus that can be quickly configured into a variety of jigs, said device comprising:
   a tooling plate of width W and length L through a top surface of which have been formed a plurality of unthreaded alignment holes of substantially equal diameter and a plurality of threaded holes of substantially equal diameter, said holes being arranged in a rectangular array of equally spaced holes having a plurality of columns containing only unthreaded holes and a plurality of columns containing only threaded holes, wherein any pair of adjacent columns consists of a column of threaded holes and a column of unthreaded holes, whereby, in any pair of nearest columns of unthreaded holes, three holes can be selected that form a right triangle containing an angle selected from the set consisting of 30°, 45° and 60°;
   a plurality of alignment pins, each adapted to fit closely into one of said unthreaded holes such that there is substantially no wobble of a pin in an unthreaded hole and such that each pin can be easily removed by hand from one of said unthreaded holes, thereby enabling these pins to be quickly inserted and/or removed from said unthreaded holes while retaining a sufficiently close fit that these pins serve as accurate alignment pins for a workpiece;
   a plurality of bolts with threads that can screw into the threaded holes; and at least one clamp having an opening therethrough through which one of said bolts can be inserted and threaded into a threaded hole of the tooling plate, whereby alignment pins can be inserted into selected holes of the tooling plate to form a jig and whereby said at least one clamp can hold a workpiece rigidly against the tooling plate.

2. An apparatus as in claim 1 further comprising an alignment bar that includes therein
   an unthreaded hole of diameter equal to the diameters of the unthreaded holes in the tooling plate, and
   an opening through which one of said bolts can be inserted into one of the threaded holes in the tooling plate to hold the alignment rigidly against the tooling plate,
   wherein said opening in the alignment bar has a width $W_o$ and length $L_o$ such that, when this entire opening overlaps the rectangular array of threaded holes, for any orientation of the alignment bar, this opening covers an entire threaded hole, whereby, this alignment clamp can be rigidly attached to the tooling plate in any orientation whereby said alignment bar can be rotatably anchored at one end with an alignment pin that is inserted through the hole in this alignment bar into an unthreaded hole in the tooling plate and whereby this alignment bar can be rotated about this alignment pin to a desired orientation on the plate and then anchored in place by a bolt threaded into one of said threaded holes in the tooling plate.

3. An apparatus as in claim 1 wherein said tooling plate further comprises a pair of holes for half inch diameter Allen head bolts with centers spaced 3.875 inches apart, each of these two holes including a bored portion that enables the Allen head bolt to be screwed into a recessed position in said tooling plate, whereby Allen head bolts can be used to attach this tooling plate in a vertical orientation into a standard milling machine vice.

4. An apparatus as in claim 2 wherein said alignment bar has a length $L_o$ that is enough less than the width W and the length L of the tooling plate that, for any orientation of the alignment bar, said alignment bar can be positioned such that it does not extend past any part of a perimeter of said tooling plate.

5. An apparatus as in claim 1 wherein said tooling plate is aluminum and is protected by a black anodized coating.

6. An apparatus as in claim 1 further comprising at least one hold down clamp having in one end a threaded hole in which is threaded a bolt such that a head of the bolt is located between said tooling plate and the clamp so that this bolt provides an adjustable spacer between a top surface of the tooling plate and a bottom surface of this clamp, whereby this bolt can be used to adjust a spacing between that end of the clamp and the tooling plate and having therethrough an opening through which one of said bolts can be inserted into one of the threaded holes in the tooling plate to rigidly attach this clamp against a workpiece that is in contact with the top surface of the tooling plate.

7. An apparatus that can be quickly configured into a variety of jigs, said device comprising:

a tooling plate of width W and length L through a top surface of which have been formed a plurality of unthreaded alignment holes of substantially equal diameter and a plurality of threaded holes of substantially equal diameter;

a plurality of alignment pins, each adapted to fit closely into one of said unthreaded holes such that there is substantially no wobble of a pin in an unthreaded hole and such that each pin can be easily removed by hand from one of said unthreaded holes, thereby enabling these pins to be quickly inserted and/or removed from said unthreaded holes while retaining a sufficiently close fit that these pins serve as accurate alignment pins for a workpiece;

a plurality of bolts with threads that can screw into the threaded holes; and at least one clamp having an opening therethrough through which one of said bolts can be inserted and threaded into a threaded hole of the tooling plate, whereby alignment pins can be inserted into selected holes of the tooling plate to form a jig and whereby said at least one clamp can hold a workpiece rigidly against the tooling plate;

wherein said tooling plate has a rectangular recess at each of a top and a bottom back edge of this tooling plate, whereby these recesses can be utilized to position the tooling plate in a horizontal orientation in a vice that clamps the tooling plate at a pair of sidewalls of these recesses.

8. A method of mounting a workpiece to a tooling plate by means of at least one alignment pin and a clamp that has a first bolt threaded into a hole in one end of the clamp and that has therethrough an unthreaded opening through which a second bolt can be inserted, said method comprising the steps of:

(a) inserting at least one alignment pin into an unthreaded hole in a tooling plate that contains a rectangular array of threaded holes and a rectangular array of unthreaded holes such that these holes form a pattern of rows and columns of holes in which each column contains only one of these two types of holes and in which any pair of adjacent columns includes a column of threaded holes and a column of unthreaded holes, said columns being spaced apart at a distance equal to a spacing between all holes in any of these columns;

(b) placing the workpiece in contact with a top surface of the tooling plate and in contact with said at least one alignment pin;

(c) placing said clamp in contact with said workpiece in a position suitable for clamping the workpiece to the tooling plate and oriented such that a head of said first bolt is positioned between the clamp and the tooling plate;

(d) adjusting said first bolt within said hole in the end of the clamp such that said clamp is substantially parallel to said tooling plate;

(e) inserting a threaded end of said second bolt through said unthreaded opening in the clamp into a threaded hole in the tooling plate; and (f) tightening said second bolt sufficiently to hold said workpiece in place during machining operations on this workpiece.

9. A method as in claim 8 further comprising before step (b) the steps of:

($\alpha$) inserting an alignment pin through an unthreaded hole in an end of an alignment bar into an unthreaded hole in the tooling plate, said alignment bar having an opening of sufficient length and width that, for any desired orientation of this alignment bar on the tooling plate, there is a threaded hole in the plate aligned completely within said opening such that a bolt can be inserted through this opening into this threaded hole;

($\beta$) rotating said alignment bar about this alignment pin to said desired orientation on the tooling plate;

($\gamma$) inserting a bolt through this opening into a threaded hole in the tooling plate; and ($\delta$) tightening this bolt sufficiently to hold the alignment bar in place during steps (b)-(f).

10. A method as in claim 8 wherein, step (a) comprises the steps of:

(a1) inserting an alignment pin into a first unthreaded hole located in a first column of unthreaded holes; and (a2) inserting an alignment pin into a second unthreaded hole spaced one row and two columns away from said first unthreaded hole, whereby these two pins are aligned in a direction that forms an angle of 60° relative to a direction of said columns.

11. A method as in claim 8 wherein, step (a) comprises the steps of:

(a1) inserting an alignment pin into a first unthreaded hole located in a first column of unthreaded holes; and (a2) inserting an alignment pin into a second unthreaded hole spaced four rows and two columns away from said first unthreaded hole, whereby these two pins are aligned in a direction that forms an angle of 30° relative to a direction of said columns.

* * * * *